US007707503B2

(12) United States Patent
Good et al.

(10) Patent No.: US 7,707,503 B2
(45) Date of Patent: Apr. 27, 2010

(54) METHODS AND SYSTEMS FOR SUPPORTING PRESENTATION TOOLS USING ZOOMABLE USER INTERFACE

(75) Inventors: Lance Everett Good, Cupertino, CA (US); Benjamin B. Bederson, University Park, MD (US); Mark J. Stefik, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1037 days.

(21) Appl. No.: 10/740,467

(22) Filed: Dec. 22, 2003

(65) Prior Publication Data

US 2005/0138570 A1   Jun. 23, 2005

(51) Int. Cl.
*G06F 3/00* (2006.01)
*G06F 3/048* (2006.01)
(52) U.S. Cl. .................. 715/732; 715/730; 715/815
(58) Field of Classification Search ................ 715/732
See application file for complete search history.

(56) References Cited

U.S. PATENT DOCUMENTS

| | | | |
|---|---|---|---|
| 5,341,466 | A | 8/1994 | Perlin et al. |
| 5,859,623 | A * | 1/1999 | Meyn et al. ............... 715/730 |
| 6,091,408 | A * | 7/2000 | Treibitz et al. ............. 715/753 |
| 6,195,093 | B1 | 2/2001 | Nelson et al. |
| 6,509,909 | B1 | 1/2003 | Nelson et al. |
| 7,058,891 | B2 * | 6/2006 | O'Neal et al. ............. 715/730 |
| 7,131,068 | B2 * | 10/2006 | O'Neal et al. ............. 715/730 |
| 2004/0088678 | A1 * | 5/2004 | Litoiu et al. .............. 717/104 |

OTHER PUBLICATIONS

Staying in the Flow with Zoomable User Interfaces, Lance Good, Apr. 20-25, 2002, From http://delivery.acm.org/10.1145/510000/506475/p548-good.pdf?key1=506475&key2=8197055711&coll=GUIDE&dl=GUIDE&CFID=18876729&CFTOKEN=75893317, pp. 548-549.*
Information Visualization, vol. 1, No. 1, Mar. 2002, from http://www.informatik.uni-trier.de/~ley/db/journals/ivs/ivs1.html pp. 1-3.*
Zoomable user interfaces as a medium for slide show presentations, Published Mar. 2002, http://goodle.org/papers/counterpoint-infovis.pdf.*
U.S. Appl. No. 10/317,017, filed Feb. 21, 2003.
Apple Keynote. http://www.apple.com/keynote.
Bederson, B.B. et al. "Pad++:A Zoomable Graphical Sketchpad for Exploring Alternate Interface Physics." *Journal of Visual Languages and Computing*, 7, pp. 3-31.

(Continued)

*Primary Examiner*—Weilun Lo
*Assistant Examiner*—Samir Termanini
(74) *Attorney, Agent, or Firm*—Oliff & Berridge, PLC

(57) ABSTRACT

Methods and systems for supporting presentation using a zoomable space. In an exemplary method, a structure, such as a hierarchy, of presentation information is provided. The presentation information may include slides, text labels and graphical elements. The presentation information is laid out in the zoomable space based on the structure. A path may be created based on the hierarchy and may be a sequence of the presentation information for the slide show. When a modification is received in at least one of the hierarchy and the layout, the path may be automatically updated based on the modification. During a presentation, the presentation information is displayed based on the path.

32 Claims, 13 Drawing Sheets

OTHER PUBLICATIONS

Bederson, B. et al. "Jazz: An Extensible Zoomable User Interface Graphics Toolkit in Java." *Proceedings of UIST 2000* pp. 171-180.

Furnas, G.W. et al. "MuSE: A Multiscale Editor" *Proceedings of User Interface Software and Technology*, pp. 107-116.

Good, L. et al.; "Zoomable User Interfaces as a Medium for Slide Show Presentation" *Information Visualization* 1(1) pp. 35-49.

Hightower, R. et al. "Graphical Multiscale Web Histories: A Study of PadPrints" *Proceedings of UIST* 1998, pp. 121-122.

Counterpoint: A Zooming Presentation Tool. http://www.cs.umd.edu/hcil/counterpoint.

Nelson, L. et al. "Palette: A Paper Interface for Giving Presentations" *Proceedings of CHI 99 Conference on Human Factors in Computing Systems*, May 1999, pp. 354-361.

Toyoda, M. et al. "Hyper Mochi Sheet: A Predictive Focusing Interface for Navigating and Editing Nested Networks through a Multi-Focus Distortion-Oriented View" *Conference on Human Factors in Computing Systems* 1999, pp. 504-511.

Dieberger, A. et al. "Supporting Narrative Flow in Presentation Software" *Proceedings of UIST 2000*.

Good, L. et al.; "CounterPoint: Creating Jazzy Interactive Presentations" *Proceedings of UIST 2000*.

* cited by examiner

METHODS AND SYSTEMS FOR SUPPORTING PRESENTATION TOOLS USING ZOOMABLE USER INTERFACE

BACKGROUND OF THE INVENTION

1. Field of Invention

This invention relates to methods and systems for supporting a slide show presentation using zoomable user interface.

2. Description of Related Art

Performing presentations using computerized slide shows has become popular. Microsoft® PowerPoint® and other presentation software allow the user to create individual slides for presentation slide shows by providing an interface for mimicking physical presentation media such as 35-mm slides or overhead transparencies. In the days of physical slides or transparencies, the linear search meant flipping through slides in a carousel or through transparencies in a pile. In software presentation tools, this search often means scrolling through the linear sequence of slides. Software presentation tools also typically offer interfaces to simplify jumping to a slide out of the linear sequence. Such interfaces include scrollable lists of slide titles, a scrollable grid of slide thumbnails, or hyperlinks.

In the case of scrolling lists or grids, user interfaces typically make use of traditional GUI (graphical user interface) features that were designed primarily for use at an individual workstation. As a result, they can be inappropriate in the presentation setting as they require a high level of attention and pointing precision. In addition, the presenter often has a latent goal of maintaining a professional appearance. Yet, traditional interface designs may be professionally inappropriate both because of the precision needed for use and their general visual appearance. In contrast, hyperlinks reduce the amount of attention and precision needed to navigate out of the linear sequence. They can also be authored to be visually consistent with the presentation content. However, hyperlinks are frequently not created because presenters are frequently unable or unwilling to anticipate all the points at which they may want to deviate from the primary storyline.

A related problem with the slide show metaphor arises in reusing a presentation with multiple audiences. Such reuse often even occurs in impromptu situations. In these situations, the presenter typically adapts the existing presentation by omitting or including details as time or feedback require. Under the slide show metaphor, this often means scrolling past slides and improvising transitions to accommodate for the lacking visual aid. Again, the presenter is left to orient the audience to any modifications made to the original linear slide order.

In this type of systems, the user can place each slide in order so that the slides are shown to his/her audience sequentially as the presentation is preceded. However, the user must follow a predetermined sequence during the presentation and do not have a freedom to easily return to the previous subjects and/or search specific information without going through each slide.

Another system for presentation allows a user to better organize the slides having the user manually create a hierarchy for the slides so that the user becomes aware of the categories. However, during the presentation, this software uses the traditional mere sequence of the slides, resulting in the deficiencies similar to those described above.

SUMMARY OF THE INVENTION

Therefore, it is an object of this invention to overcome the above described deficiencies. This invention provides methods and systems for supporting presentation tools using user interface, to minimize the input needed from the user to navigate slide presentations in a zoomable user interface.

Various exemplary embodiments of this invention provide a method for supporting presentation in a zoomable space, including providing a structure of presentation information, the presentation information including one or more of slides, text labels, and graphical elements, and synchronizing a layout of the presentation information in the zoomable space based on the structure of the presentation information.

In addition, various exemplary embodiments this invention provide a method for supporting presentation in a zoomable space, including providing a structure of presentation information, the presentation information including one or more of slides, text labels, and graphical elements, providing a layout of the presentation information in the zoomable space, providing a path based on the structure of the presentation information, and automatically updating the path based on a modification upon receiving the modification in at least one of the structure of the presentation information and the layout.

Furthermore, various exemplary embodiments this invention provide a method for supporting presentation in a zoomable space, including providing a hierarchy of presentation information, the presentation information including one or more of slides, text labels, and graphical elements, providing a layout of the presentation information in the zoomable space based on the hierarchy, allowing a user to navigate the presentation information in a direction in the zoomable space, the direction including navigating to at least one of a higher level of the hierarchy, a lower level of the hierarchy, and the presentation information in the same level of the hierarchy.

Various exemplary embodiments of this invention also provide a system for supporting presentation in a zoomable space, including a structure construction circuit, routine or application that provides a structure of presentation information, the presentation information including one or more of slides, text labels and graphical elements, and a layout management circuit, routine or application that synchronizes a layout of the presentation information in the zoomable space based on the structure of the presentation information.

Moreover, various exemplary embodiment of this invention provide a system for supporting presentation in a zoomable space, including a structure construction circuit, routine or application that provides a structure of presentation information, the presentation information including one or more of slides, text labels and graphical elements, a layout management circuit, routine or application that provides a layout of the presentation information in the zoomable space, and a path construction/update circuit, routine or application that creates a path based on the structure of the presentation information and automatically updates the path based on a modification upon receiving the modification in at least one of the structure of the presentation information and the layout.

In addition, various exemplary embodiment of this invention provide a system for supporting presentation in a zoomable space, including a structure construction circuit, routine or application that provides a hierarchy of presentation information, the presentation information including one or more of slides, text labels and graphical elements, a layout management circuit, routine or application that provides a layout of the presentation information in the zoomable space based on the hierarchy, and a navigation circuit, routine or application that allows a user to navigate the presentation information in a direction in the zoomable space, the direction including navigating to at least one of a higher level of the hierarchy, a lower level of the hierarchy, and the presentation information in the same level of the hierarchy.

BRIEF DESCRIPTION OF THE DRAWINGS

Various exemplary embodiments of the systems and methods according to this invention will be described in detail, with reference to the following figures, wherein.

DETAILED DESCRIPTION OF PREFERRED EMBODIMENTS

The exemplary embodiment according to this invention uses zoomable user interfaces (ZUIs), or zoomable space, as an alternate metaphor for software slide presentations. ZUIs display information on a conceptually infinite two-dimensional plane. They allow users to change their view of this plane through panning and zooming to access more information than would typically be displayed on a single screen. An example of ZUI system is disclosed in co-pending U.S. patent application Ser. No. 10/317,017, filed Feb. 21, 2003, entitled "System and Method for Interaction of Graphical Objects on a Computer Controlled System," which is incorporated herein by reference in its entirety.

One of the characteristics of these types of zooming and panning operations in ZUIs is that they are animated. These types of animations give a sense of physical movement by mimicking such physical acts as sliding a paper on a table (panning), looking at a paper more closely for detail (zooming in), or holding a paper at a distance for more context (zooming out).

The zoomable space adapts well to presentations because of its natural support for hierarchies. Hierarchies are one of the fundamental structures used in presentation settings. Hierarchies are a natural format for organizing data as they allow topics to be recursively subdivided into increasingly smaller units of information. The ZUI metaphor facilitates a spatial portrayal of hierarchies that mimics a 2D projection of a physical tree. In addition, ZUIs allow for visually distinguishing hierarchy levels by placing them at varying levels of scale or magnification. This change in magnification can decrease consistently between levels of detail to portray hierarchical nesting across the presentation.

FIGS. 1-7 show an exemplary embodiment of a presentation support tool 100 using zoomable user interface for support of presentation information including slides and text labels. The slides may include textual information, graphical information, multimedia information, and the like. The text labels may include textual information describing a group of such presentation information.

Figure 1:
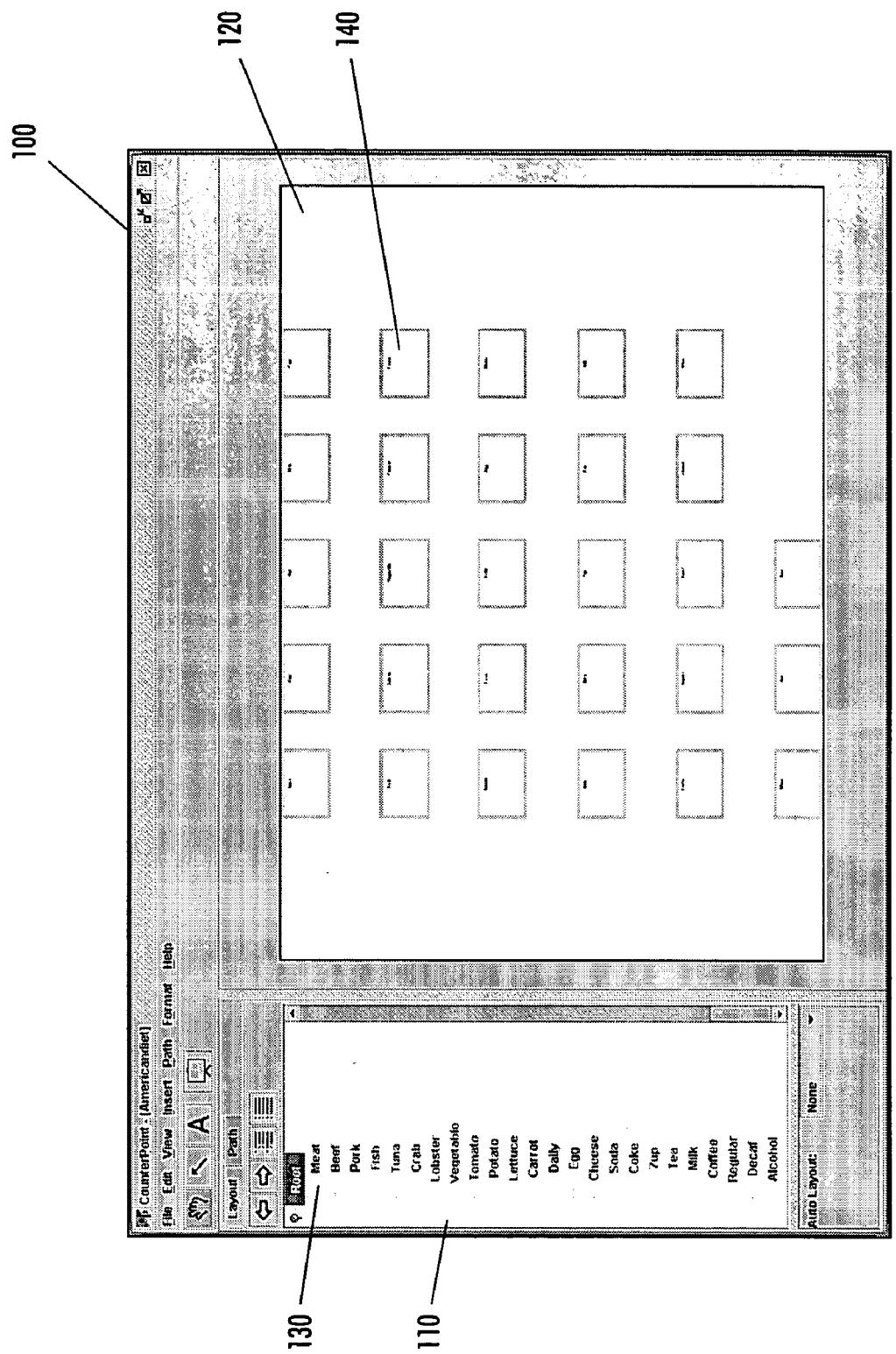
FIGS. 1-10 show various stages in preparing a slide presentation using a presentation support tool according to an exemplary embodiment according to this invention.

As shown in FIG. 1, for example, presentation support tool 100 may be provided with a section 110 to display slide titles in one or more structures, such as hierarchies, and a section 120 to display the zoomable space. FIG. 1 shows an example of an initial stage of organizing the presentation slides. At this stage, because slide titles 130 are in the same level in the hierarchy, actual slides 140 corresponding to each slide title 130 in the section 110 are laid out equally in the zoomable space 120. In FIG. 1, the slide titles 130 are used to indicate the corresponding slides 140. However, other indication methods, such as, for example, showing thumbnail images, are also possible.

Figure 2:
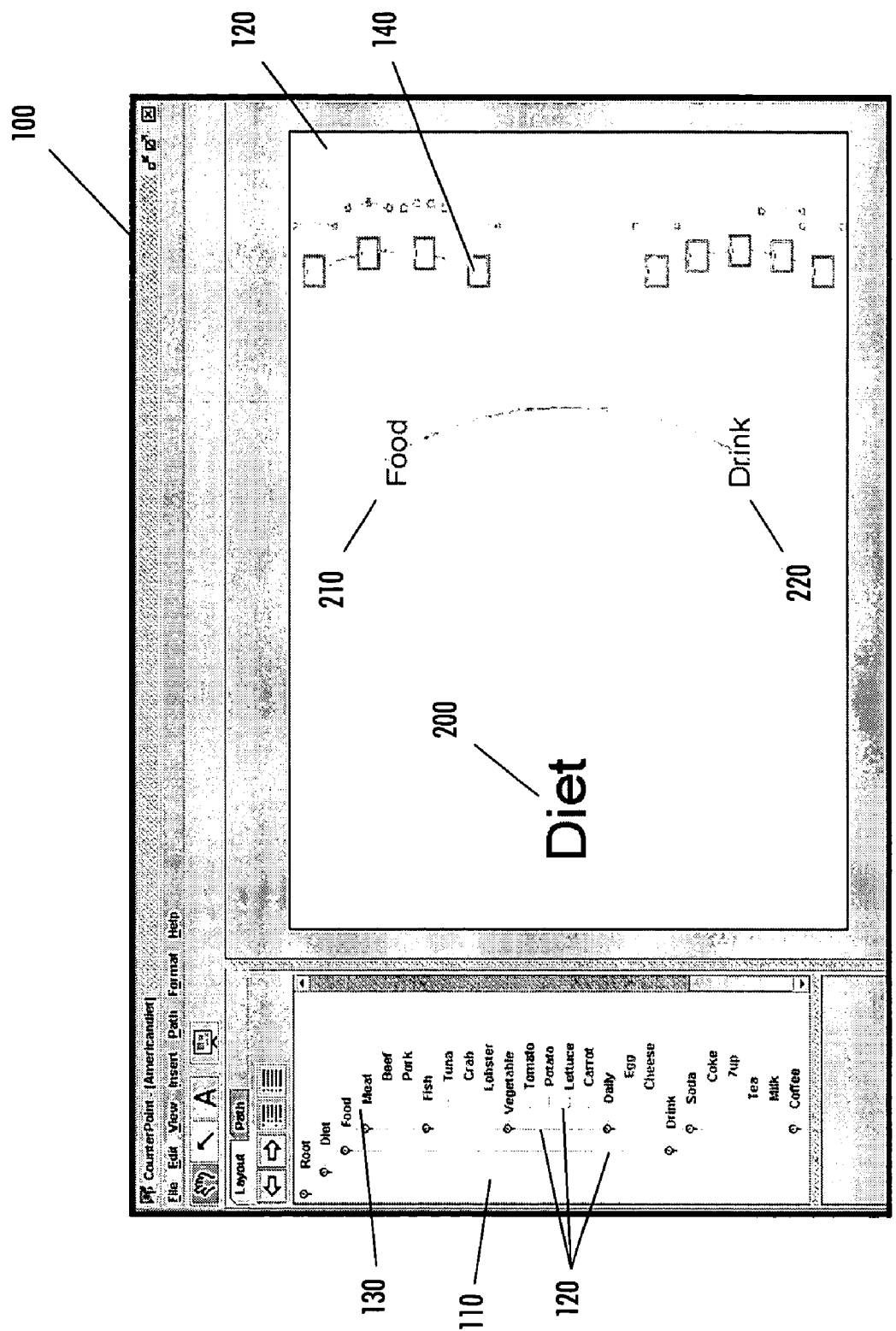

Next, as shown in FIG. 2, a text label may be added to provide a parent category for the slides. In this example, text labels "Diet" 200, "Food" 210 and "Drink" 220 are provided. Text labels 200, 210 and 220, may be directly entered by a user interface, such as a keyboard, in the zoomable space 120, or added in the section 110. If the text labels are directly entered in the zoomable space 120, the tool 100 may automatically add the text labels 200, 210 and 220 in the hierarchy 112, by synchronizing the hierarchy 112 and the zoomable space 120. Similarly, if the text labels are added in the hierarchy 112, they may automatically appear in the zoomable space 120.

To establish a hierarchy 112, the user may move the slide titles 130 by, for example, using a tab on the keyboard. This indents a child slide title under a parent text label and/or a parent slide title. The user may also use a user interface like a mouse to move the slide title 130. The user may also rearrange the hierarchy 112 at any point. The hierarchy 112 may also be established automatically known or later-developed algorithms.

The user can also change the hierarchy using the zoomable space 120. In other words, the user may use a mouse or the like to move each slide 140 into or out from a text label and/or another slide by, for example, a drag-and-drop operation.

Once the hierarchical structure is established, a spatial layout is generated in a zoomable space based on the hierarchies by synchronizing the layout with and the hierarchies. This may be done automatically when the construction of hierarchies is completed or in real time as the hierarchies are being constructed and modified, by, for example, synchronizing each other based on the modification.

Figure 3:
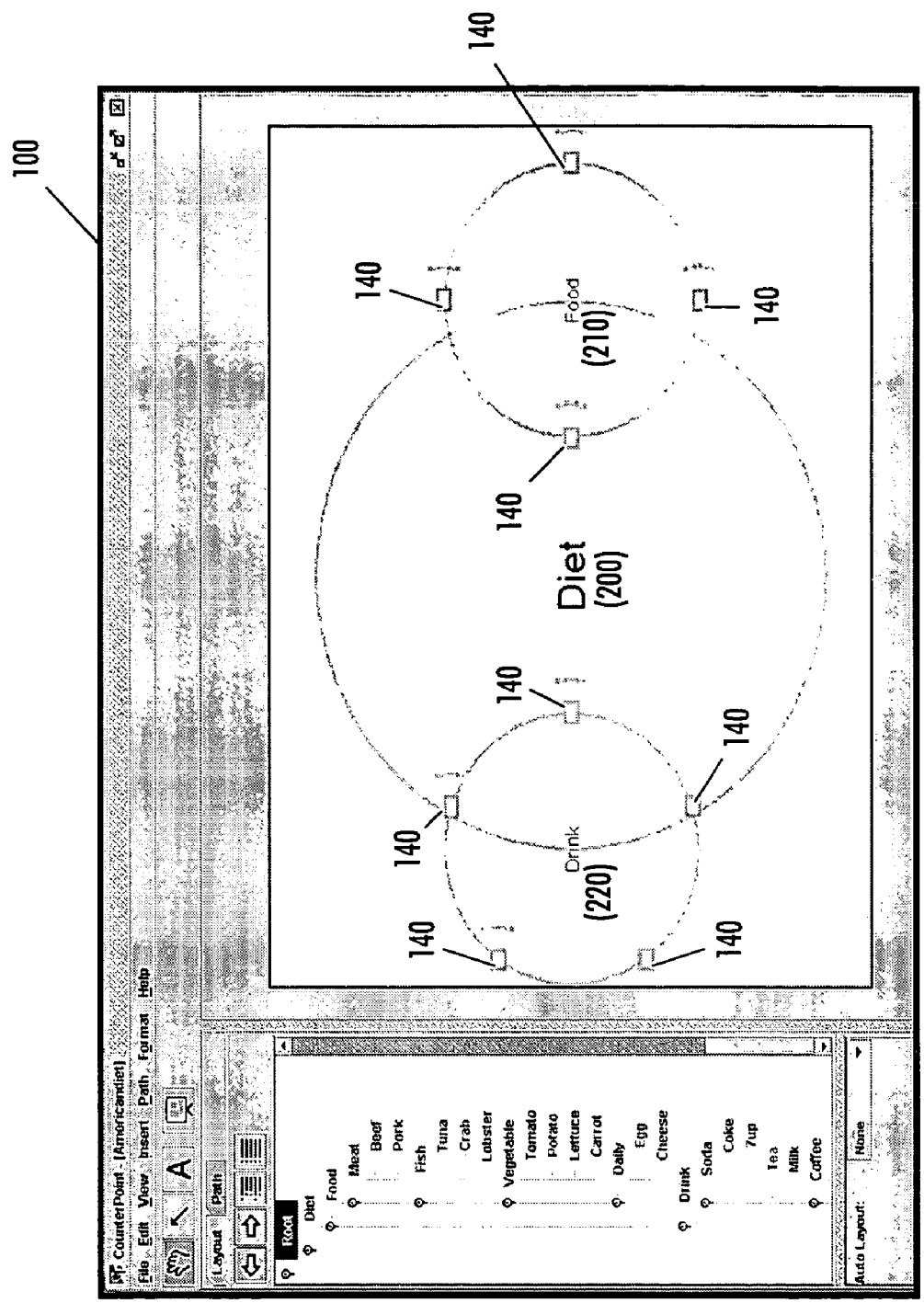
Figure 4:
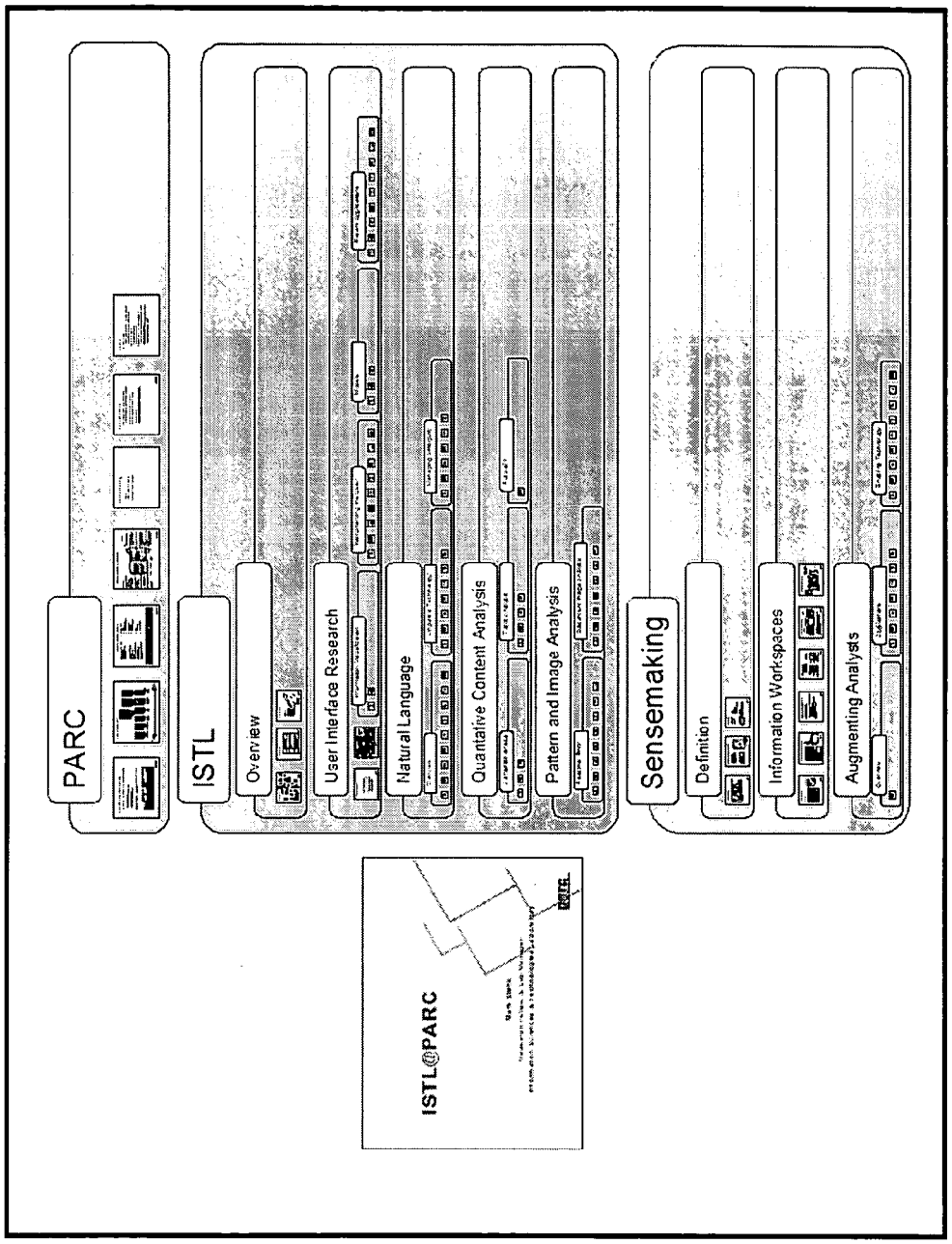
Figure 5:
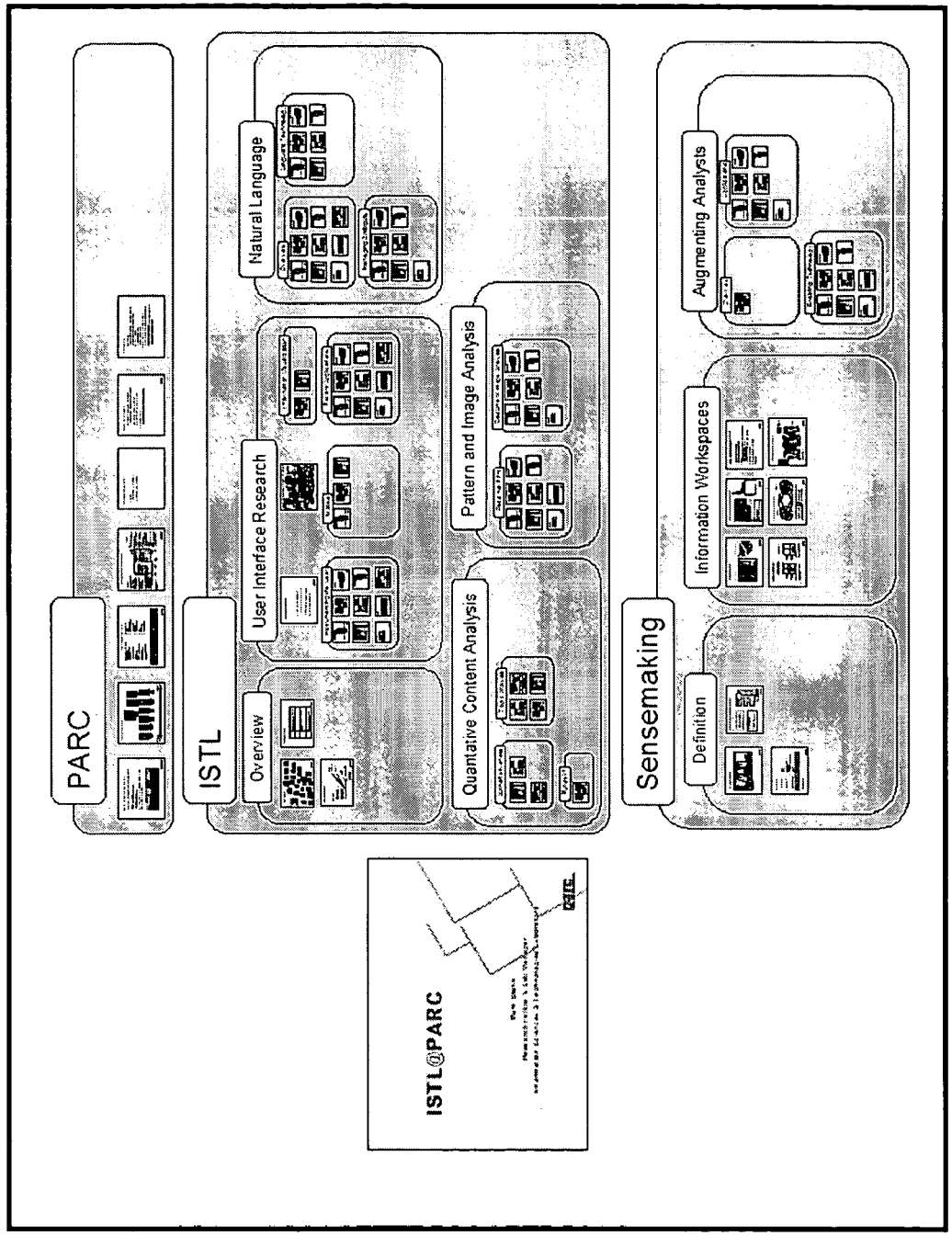
Figure 6:
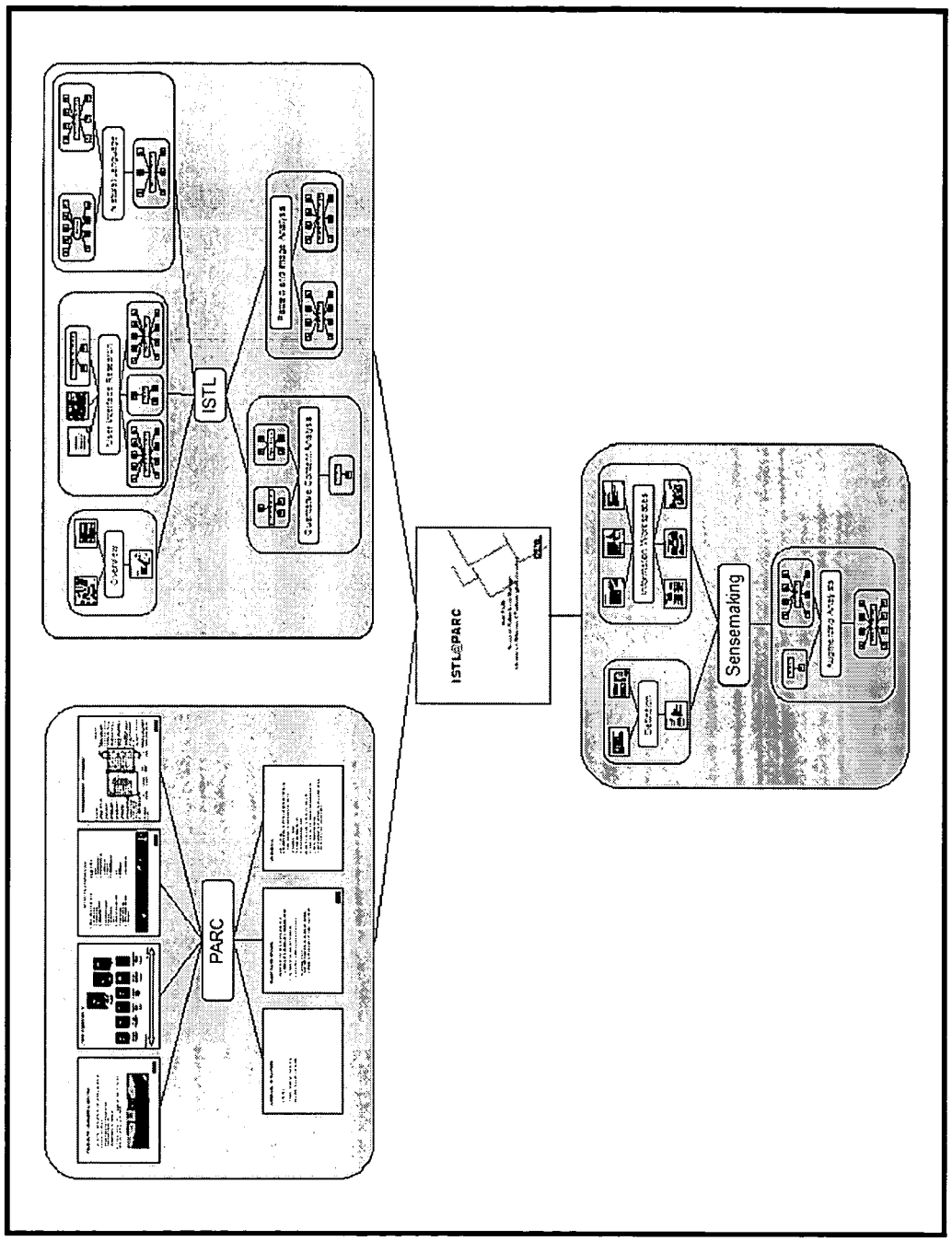

FIG. 2 shows an example of the spatial layout in the zoomable space 120. In this example, the hierarchies may be automatically laid out in an arc format. As shown in FIG. 3, the text labels 200, 210 and 220 and the slides 140 may also be laid out in a circular format. Other examples include an outline format, a nested rectangular grouping, a network format, a rectangular format, a line format, and the like, as shown in FIGS. 4-6. These formats may be varied in each level of hierarchy and may be changed at any time as desired. Colors of the zoomable space and/or items in the hierarchies, properties of the hierarchies, text label sizes and text label positions of the hierarchies may also be modified as desired.

As shown in FIG. 3, a parent text label "Diet" 200 has child text labels "Food" 210 and "Drink" 220. The child text labels 210 and 220 have the slides 140 based on the hierarchy. In this example, to show the physical relationships between the parent and child items, the magnification of the zoomable space is set such that children in the hierarchies are smaller than their parents.

Figure 7:
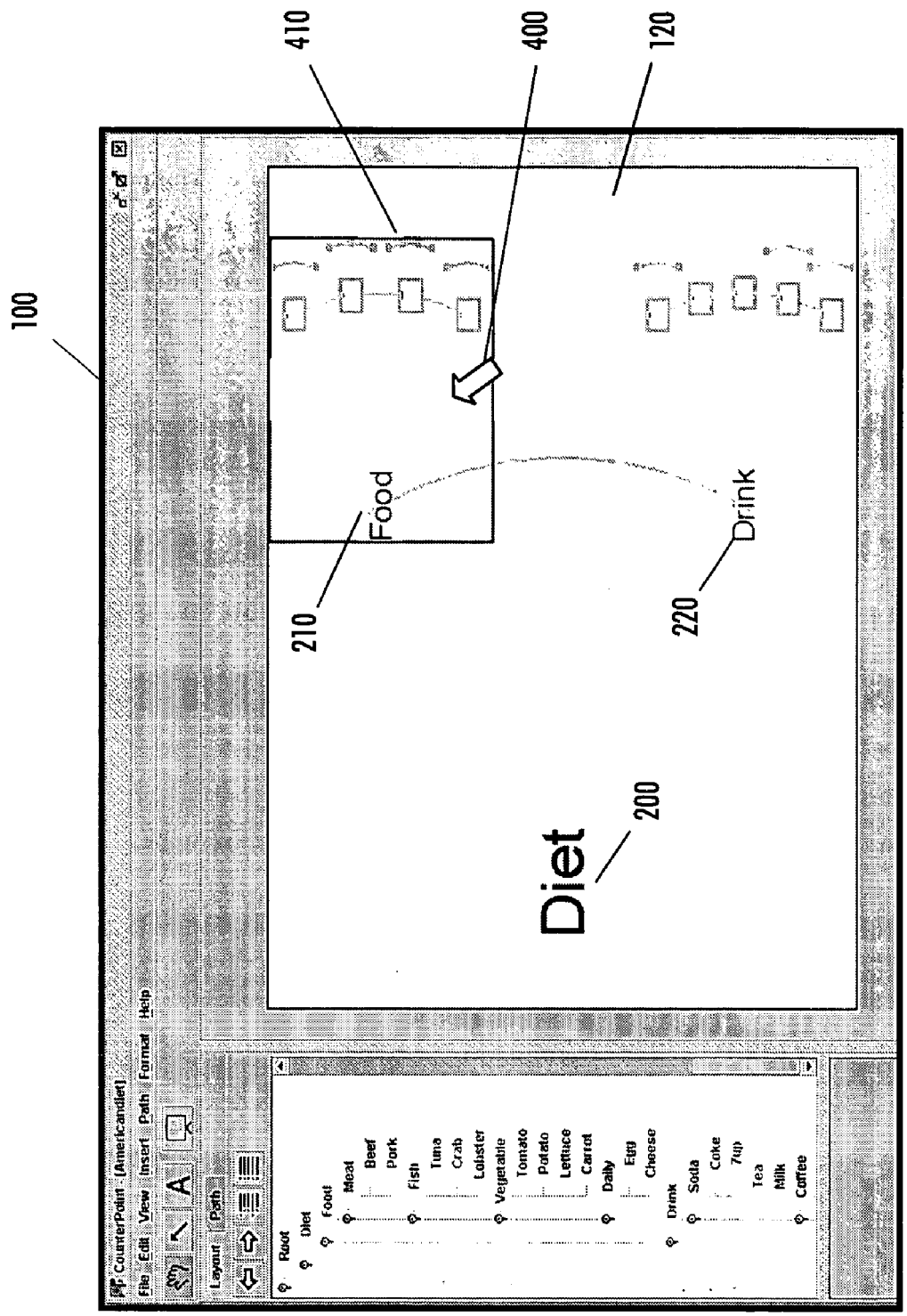
Figure 8:
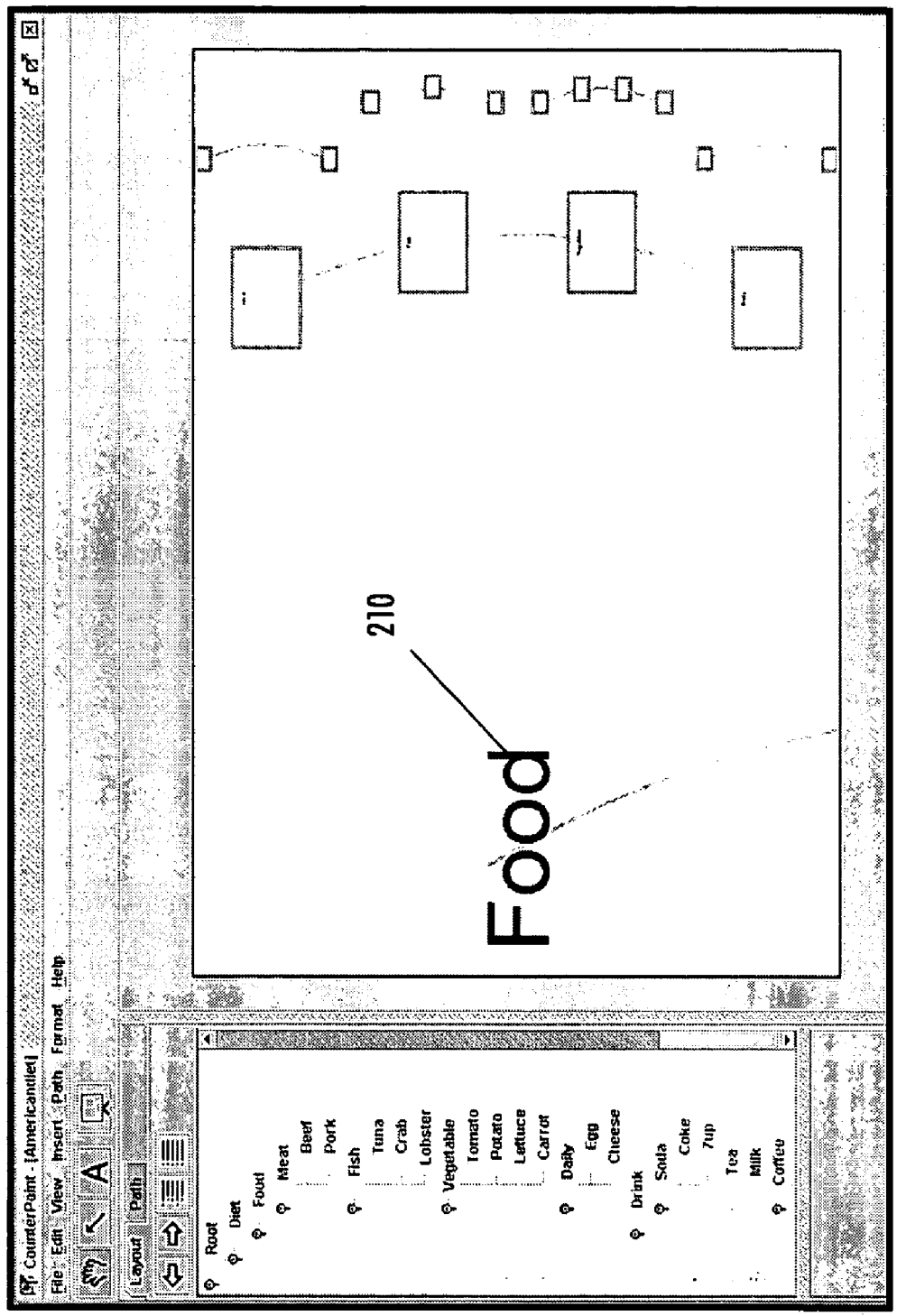

As shown in FIGS. 7 and 8, the user can zoom into a particular area in the zoomable space 120. When the user moves a mouse pointer 400 or the like over a particular area (e.g., near the text label 210), an indicator 410, such as a red rectangle, indicates hierarchical relationships around such a particular area. Other indicators are also possible, such as a circular shape, highlighting and/or flashing the area, and the like. If the user selects the particular area by, for example, clicking in the particular area, the particular area is zoomed in as shown in FIG. 8. Of course, the user can zoom out from the particular area as desired.

The user also can freely move any text labels and slides in the zoomable space. For example, if the user moves the text label "Food" 200 shown in FIG. 7, its child slides also move without breaking their hierarchies.

Figure 9:
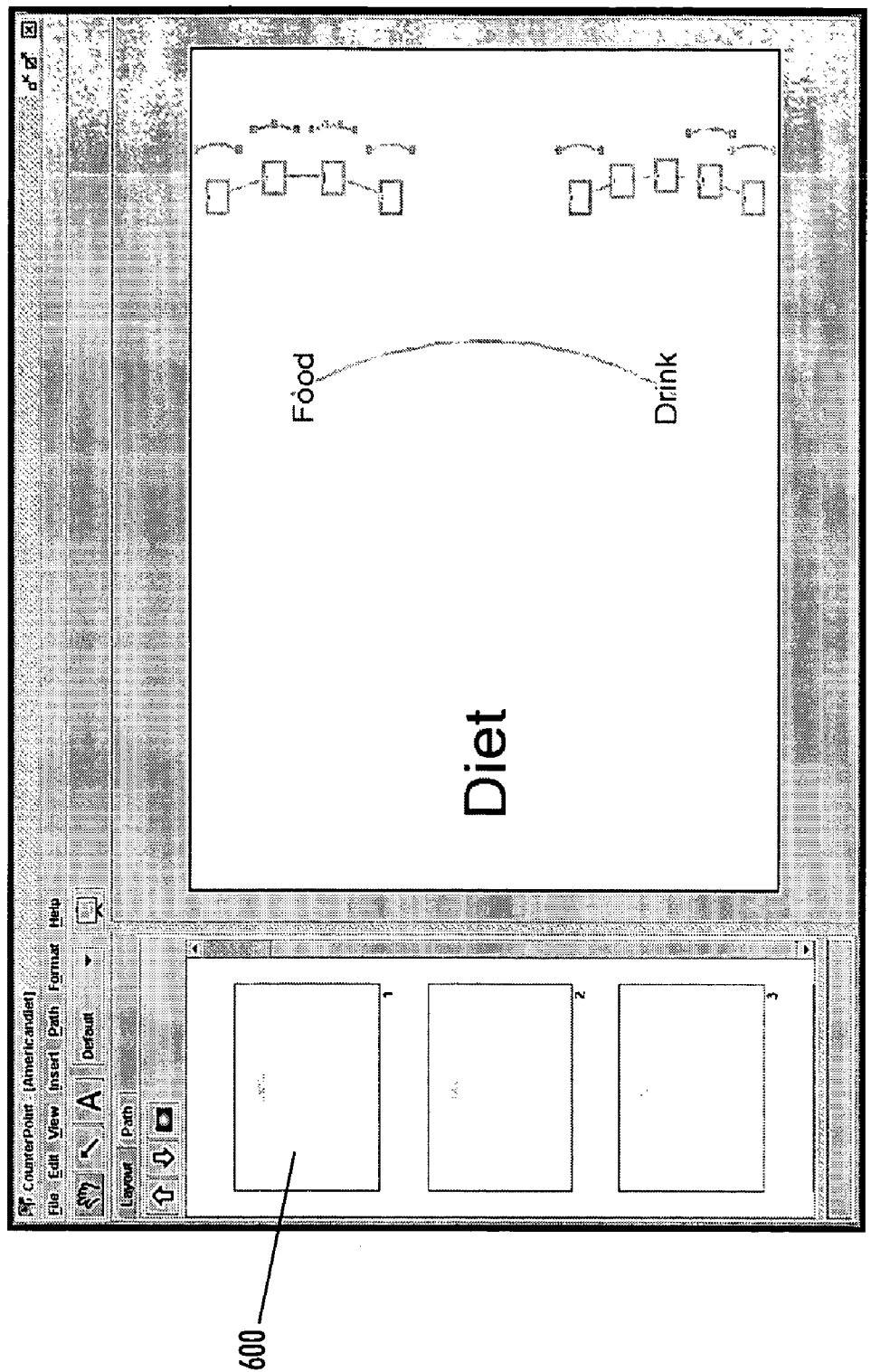
Figure 10:
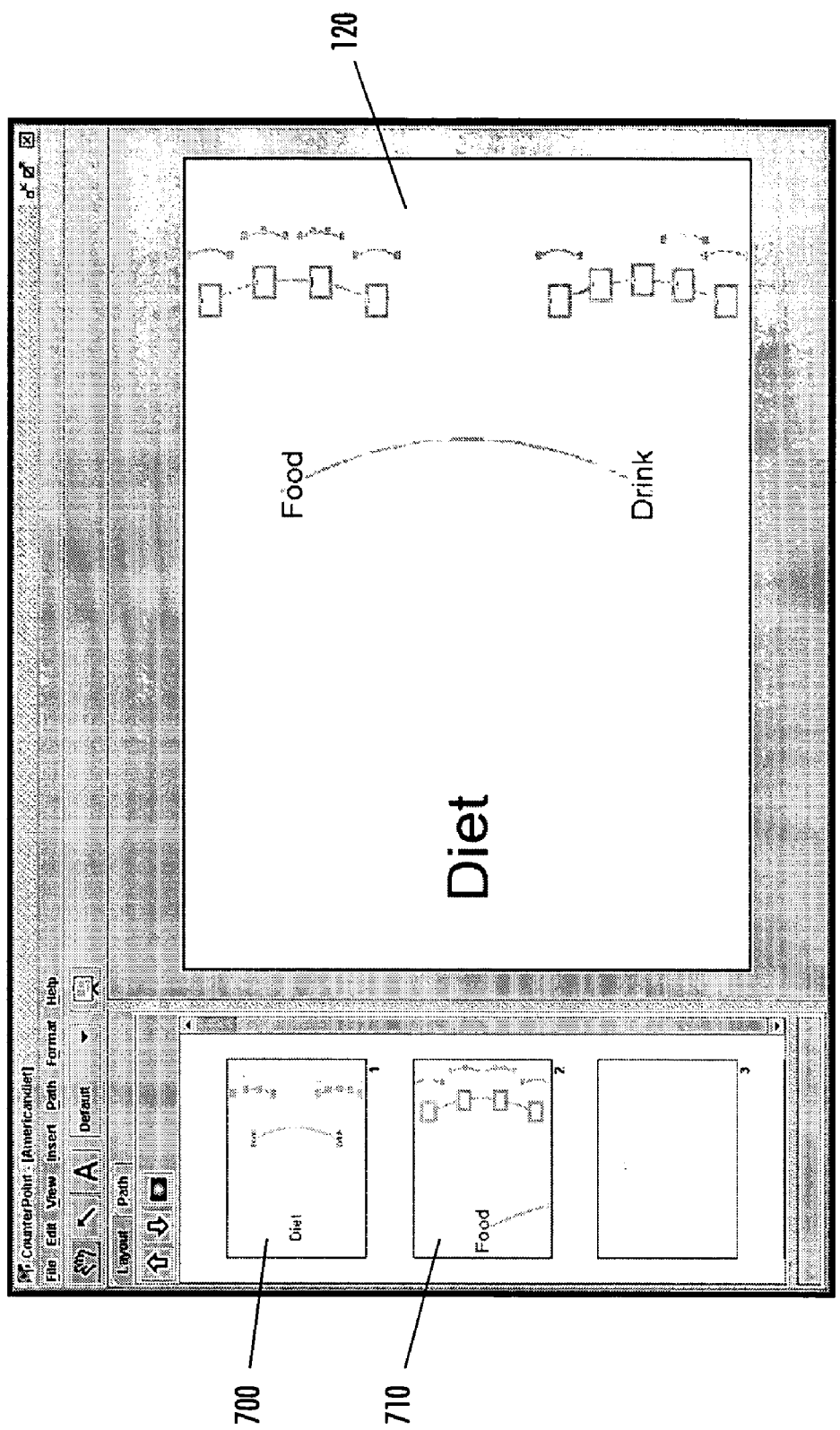

Next, creating paths through the zoomable space taken during the presentation is described. When a presentation is prepared, a single path is generated that visits each of the slides. An example of a path is shown in FIGS. 9 and 10. In general, these paths are composed of two types of components. The first type is components inserted on a path to animate the slide to full screen size. These slides are inserted into the path using a simple list of slide thumbnail images 600 of each slide indicating the order of the slides to be presented. Each slide may be inserted multiple times in a single path. An example of this type is shown in FIG. 9.

The second type of path components is a view of a particular region of the zoomable space. These types of views allow the user to include views containing multiple slides and the structure of the presentation. Overview thumbnail images 700 and 710 shown in FIG. 10 are examples of this type of path components. The overview thumbnail image 700 is an image of the overview of the hierarchy and shown in the zoomable space 120. The overview thumbnail image 710 is an image of a particular area in the zoomable space, such as the text label "Food" and its child slides as shown in FIG. 8, for example. These views are useful for showing an overview of the entire presentation or focused overviews of particular subsections of the presentation.

These views may be created by taking a screen snapshot or the like. For example, first, the user may navigate to a particular area of the zoomable space to be added to the path. The user then may take a snap shot of that particular region. The view (i.e., snap shot) may be represented by a thumbnail image and added to the path. These thumbnails may include live views onto the zoomable space so that modifications to the zoomable space may be reflected in the thumbnail. Multiple paths may be created to allow the user more selection of paths for the presentation. Each path may be named for easier recognition for the user.

The user always has an opportunity to modify the hierarchy at any time. To modify the hierarchy, the user may undo the indentation of a slide title 130 shown in FIG. 2 to bring the slide title 130 one level higher, or further indent the slide title 130 to make it a lower level child, for example. When the modification occurs in the hierarchy, the layout of the text labels and the slides is also modified by synchronizing with the modification of the hierarchy.

Moreover, the user may also be able to modify the hierarchy using the zoomable space 120, i.e., modify the lay out. For instance, the user may be able to drag the text label "Food" 210 and drop it onto the text label "Drink" 220. This brings the text label "Food" 210 under the text label "Drink" 220. Again, such a modification also modifies the hierarchical structure 110 by synchronizing the hierarchy with the layout.

When the hierarchy and the layout are modified, the path is also updated so that when the slide show is presented, the slides are presented based on the modified hierarchy and overviews. In other words, when the user updates the path by, for example, executing an update command, the tool 100 automatically synchronizes the path with the modified hierarchy and the overview. Accordingly, thumbnail images, such as ones shown in FIG. 10, are automatically reorganized. This allows the user to simply and quickly update the path without manually reorganizing the order of the slides to be presented and insert overviews of the relationships between the text labels and/or each slides. The user may also set the tool to automatically update the path each time a modification is made to the hierarchy and/or undo highlight the layout. If there are multiple paths, each path may also be updated upon this update operation.

When the slide show is presented, the tool 100 executes the slide show by displaying the overview and the slides in order based on the path. Such display of the slides and overview are performed using animation effects. The animation effects enable the user to feel the physical relationships between the test labels and the slides in the hierarchy. The slide may be changed automatically based on an interval time, or manually by clicking on a mouse or pressing a button on a keyboard, for example. When the last slide is displayed, the tool may go back to the beginning of the slide or freezes at the last slide displayed.

During the presentation, the user may decide to leave the path because an audience may ask a questions and the user may want to use another slide that does not come next. In this case, the user may execute a command to move to a higher or lower hierarchical level, move to another slide in the same level, or move to the top of the hierarchy. This operation is made simple because of the hierarchy in the slides. When the user navigates the zoomable space, the navigated slide or overview is displayed using animation effect. In addition, while navigating the zoomable space, indicators may appear on an edge of the display such that text labels and/or the slides near the navigated view are indicated. Moreover, when displaying the slide, indications may be made so that the user and the audience knows whether there are child slides for the displayed slide and/or the level of depth from the highest point of the hierarchy or from a predetermined depth.

Figure 11:
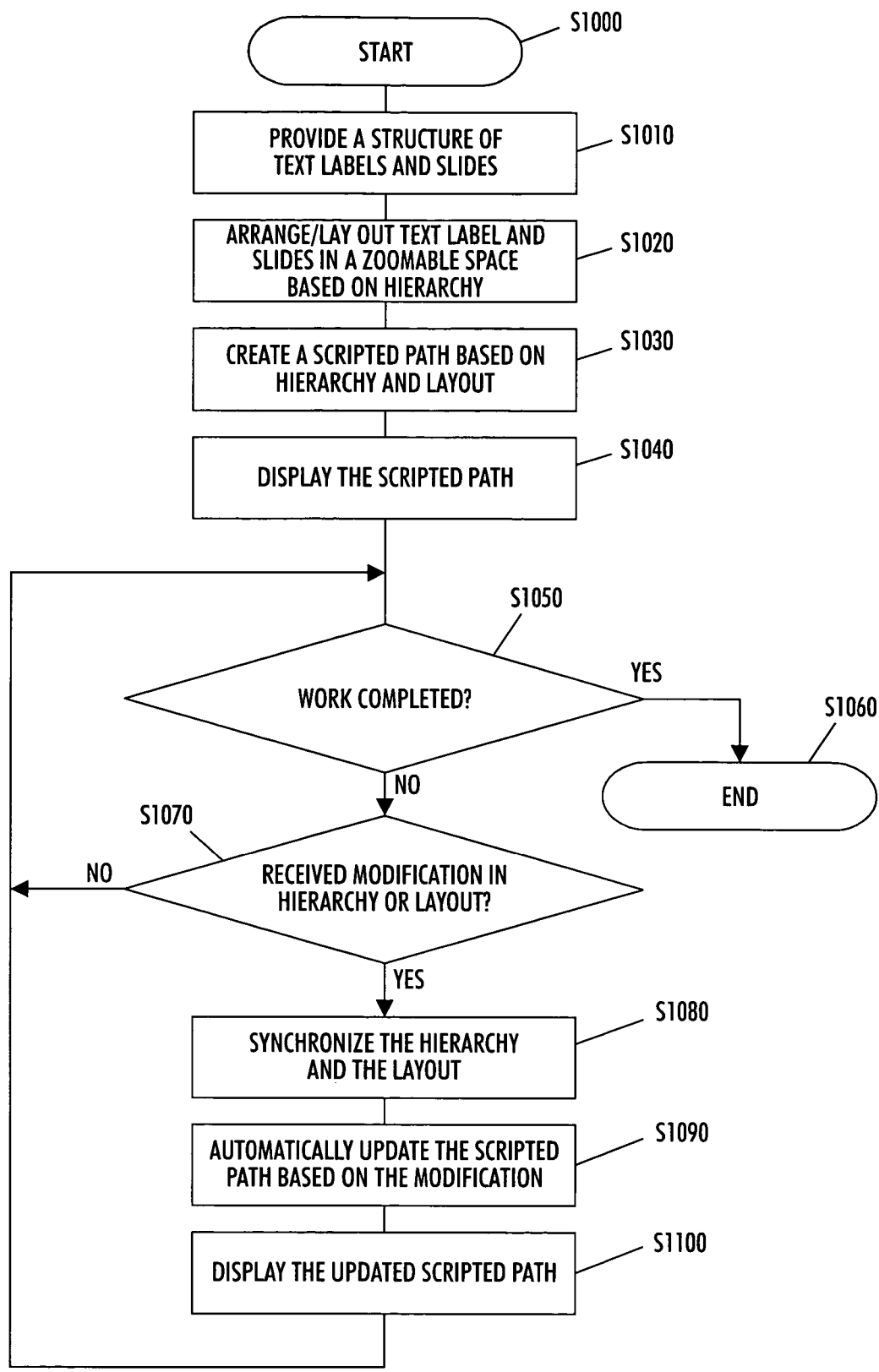
FIG. 11 is a flowchart showing a process for preparing the slide presentation.

FIG. 11 is a flowchart showing an exemplary process for constructing a hierarchy in title labels and slides. It is assumed that text labels and slides are provided in advance by the user.

The process starts at step S1000 and continues to step S1010 where a structure of the text labels and the slides is provided. The structure may be a hierarchy. Next, at step S1020, the text labels and the slides are arranged or laid out in a zoomable space based on the hierarchy by, for example, synchronizing the layout and the hierarchy. This process may be done automatically, and the text labels and the slides are laid out based on a predetermined format, such as an arc format. Then, at step S1030, a path is created based on the hierarchy. An overview of a particular area may be inserted between slides to show physical relationships between the text labels and the slides. The process may then continue to optional step S1040, where the path is displayed and/or may continue to step S1050.

In step S1050, a determination is made as to whether the user has finished working on the preparation of a slide show. If so, the process ends at step S1060; otherwise, the process jumps to step S1070.

In step S1070, a determination is made as to whether any modification to the hierarchy and/or the layout is received. If so, the process continues to step S1080. If not, the process returns to step S1060. In step S1080, the hierarchy and the layout are synchronized based on the modification. In other words, if the hierarchy is modified, the layout of the text labels and slides are modified to correspond to the modified hierarchy. On the other hand, if the layout of the text labels and the slides are changed, that is, if the hierarchical structure in the zoomable space is modified, the hierarchy is also changed to correspond to the modified layout. Then, the process moves to step S1090.

In step S1090, upon a user's instruction, the path is automatically updated. That is, the path is automatically modified based on the modification of the hierarchy and the layout, rather than having the user manually modify the path. Next, the process may continue to optional step S1100, where the updated path is displayed, and the process returns to step S1050.

Figure 12:
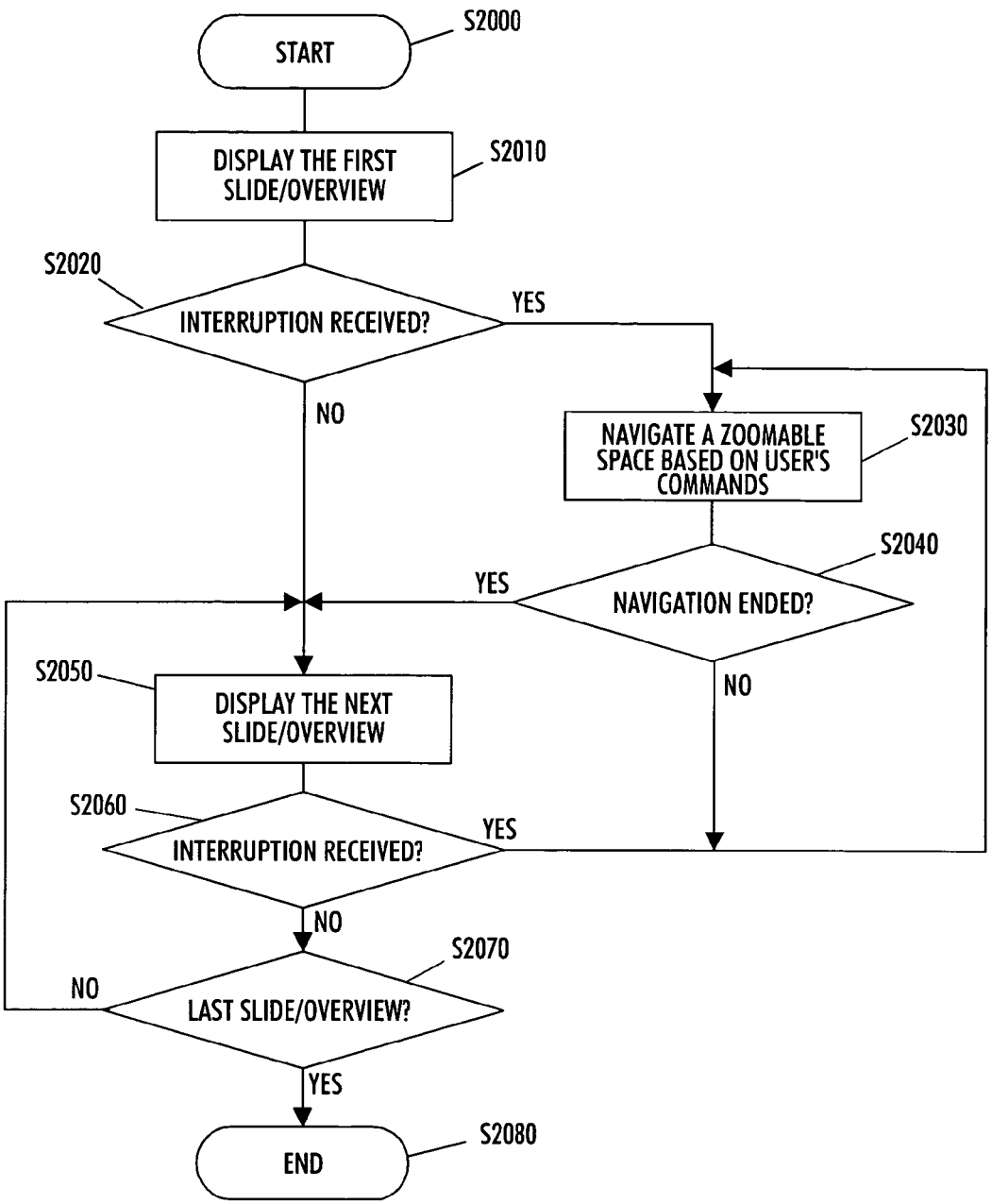
FIG. 12 is a flowchart showing a process for navigating the slide presentation.

FIG. 12 shows a flowchart showing a process for navigating text labels and slides during a slide show presentation.

The process starts at step S2000 and continues to step S2010. In step S2010, the first slide or overview is displayed. In step S2020, a determination is made as to whether an interruption is received from the user. If so, the process moves to step S2030; otherwise the process jumps to step S2050.

In step S2030, a zoomable space is navigated by the user. The user may move to a different slide in the same level of hierarchy or move to a higher or lower level of the hierarchy. The user may also zoom out the overview so that the relationships of the hierarchy is displayed. Then, the process continues to step S2030. In step S2040, a determination is made whether the navigation is ended. If so, the process continues to step S2050; otherwise, the process returns to step S2030.

In step S2050, the next slide/overview is displayed, and the process continues to step S2060. In step S2060, a determination is made as to whether an interruption is received from the user. If so, the process returns to step S2030; otherwise, the process continues to step S2070. In step S2070, a determination is made as to whether the current slide/overview is the last slide/overview. If so, the process ends at step S2080; otherwise, the process returns to step S2050.

Figure 13:
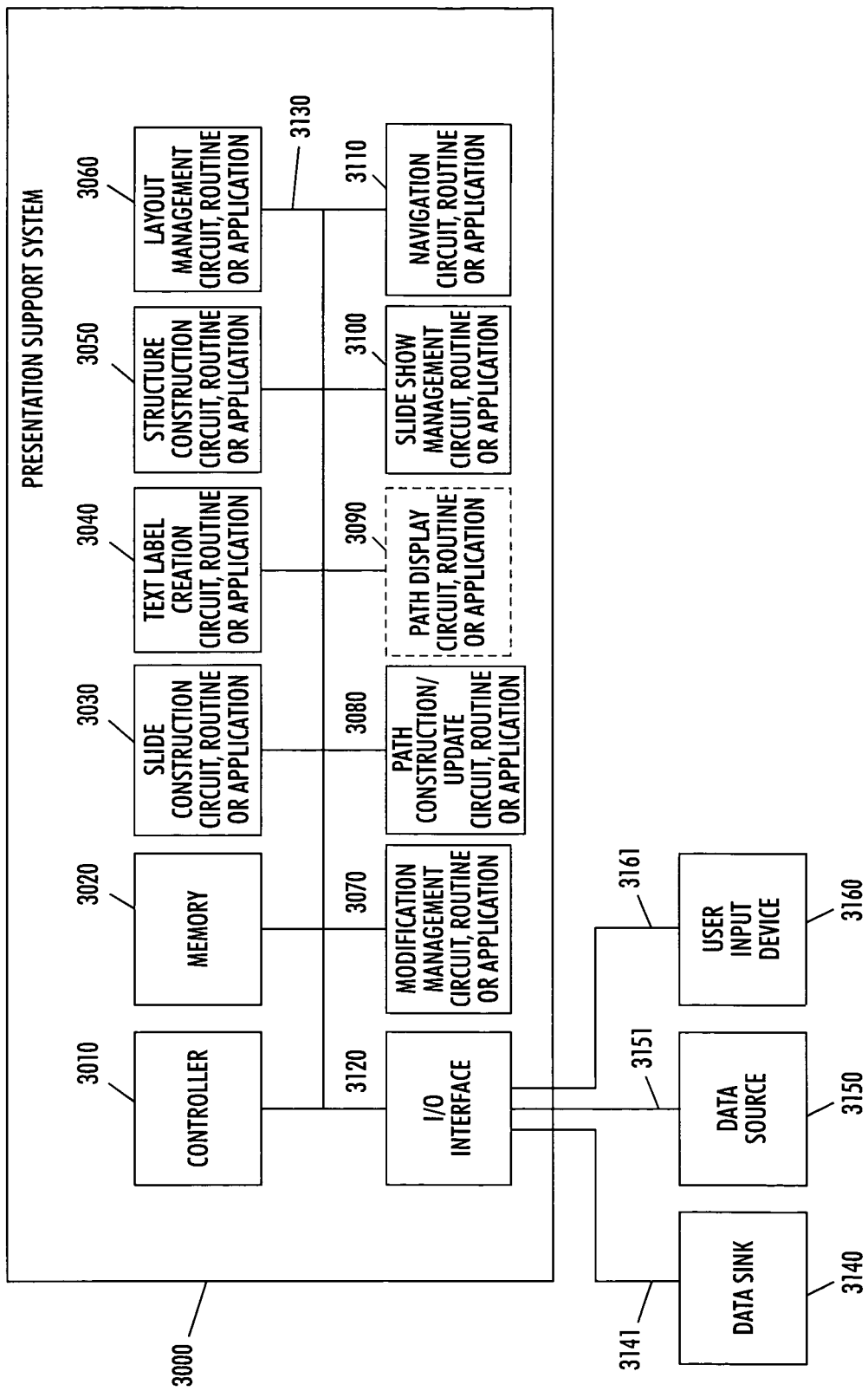
FIG. 13 is a block diagram of a presentation support system according an exemplary embodiment of this invention.

FIG. 13 shows a block diagram of a presentation support system 3000 according to the exemplary embodiment of this invention. The presentation support system 3000 includes a controller 3010, a memory 3020, a slide construction circuit, routine or application 3030, a text label creation circuit, routine or application 3040, a structure construction circuit, routine or application 3050, a layout management circuit, routine or application 3060, a modification management circuit, routine or application 3070, a path construction/update circuit, routine or application 3080, an optional path display circuit, routine or application 3090, a slide show management circuit, routine or application 3100, a navigation circuit, routine or application 3110, an input/output (I/O) interface 3120, which are connected to each other by a communication link 3130. A data sink 3140, a data source 3150 and a user input device 3160 are connected to the I/O interface 3120 via communication links 3141, 3151 and 3161, respectively.

The controller 3010 controls the general data flow between other components of the presentation support system 3000. The memory 3020 may serve as a buffer for information coming into or going out of the system 3000, may store any necessary programs and/or data for implementing the functions of the system 3000, and/or may store data, such as history data of interactions, at various stages of processing.

Alterable portions of the memory 3020 may be, in various exemplary embodiments, implemented using static or dynamic RAM. However, the memory 3020 can also be implemented using a floppy disk and disk drive, a writable or rewritable optical disk and disk drive, a hard drive, flash memory or the like.

The slide construction circuit, routine or application 3030 allows the user to create slides for a slide show. To create slides, the user may use any known or later developed technique. The text construction circuit, routine or application 3040 allows the user to create text labels in the slide show. To create text labels, the user may use any known or later developed technique, such as typing a text label in a zoomable space or insert a text label in a list slide titles that represent each slide.

The structure construction circuit, routine or application 3050 allows the user to construct a structure, such as a hierarchy, among the slides and the text labels and upon an instruction modifies the hierarchy. To construct and modify the hierarchy, the user may move a slide titles of a desired slide listed in a list slides created, by, for example, using the user input device 3160, such as a keyboard. This indents a child slide title under a parent text label and/or a parent slide title. The user may also use the user input device 3160, such as a mouse, to move the slide title. The user may also rearrange the hierarchy at any point.

The user can also change the hierarchy using the spatial layout the zoomable space. In other words, the user may use a mouse or the like to move each slide into or out from a text label and/or another slide by, for example, a drag-and-drop operation.

The layout management circuit, routine or application 3060 generates a spatial layout for each slide and/or text labels in a zoomable space and upon an instruction, modifies the spatial layout. This may be done at the time when the construction of hierarchies is completed, or in real time as the hierarchies are being constructed and modified. The layout of the slides and/or text format may be in an arc format. Other examples include a circular form, an outline format, a nested rectangular grouping, a network format, a rectangular format, and the like. These formats may be varied in each level of hierarchy and may be changed at any time as desired. Colors of the zoomable space and/or items in the hierarchies, properties of the hierarchies, text label sizes and text label positions of the hierarchies may also be modified as desired. The modification of the spatial layout may be performed by the user using a drag-and-drop operation, for example.

The modification management circuit, routine or application 3070 detects modifications in the zoomable space. When one of the hierarchy or the spatial layout is modified by the user, the modification management circuit, routine or application 3070 synchronizes the other to correspond to the modification.

The path construction/update circuit, routine or application 3080 constructs a path for a slide show presentation by sorting the slides and adding overviews of the entire zoomable space and particular areas of the zoomable space. The construction/update circuit, routine or application 3080 also updates the path based on modifications in the hierarchy of the slides and/or text labels automatically when an instruction is received from the user and/or as the hierarchy is being modified.

The optional path display circuit, routine or application 3090 displays the path using, for example, thumbnail images of the slides, the text labels and/or the overviews. When the path is updated, the optional path display circuit, routine or application 3090 displays the updated path.

The slide show management circuit, routine or application 3100 shows the slide show based on the path. That is, the slide show management circuit, routine or application 3100 displays each slide, text labels and overviews in accordance with the sequence listed in the path.

The navigation circuit, routine or application 3110 allows the user to freely navigate the slides and the text labels in the same and different levels in the hierarchy. This operation may be done using animation effects. The navigation circuit, routine or application 3110 may also display indicators on an edge of the display such that text labels and/or the slides near the navigated view are indicated. Moreover, when displaying the slide, the navigation circuit, routine or application 3110 may display indications so that the user and the audience knows whether there are child slides for the displayed slide and/or the level of depth from the highest point of the hierarchy or from a predetermined depth. The navigation circuit, routine or application 3110 also controls zooming into or zooming out from a particular area of the zoomable space.

The I/O interface 3120 provides a connection between the presentation support system 3000 and the data sink 3140, the data source 3150, and the user input device 3160, via the communication links 3141, 3151, and 3161, respectively.

The data sink 3140 can be any known or later-developed device that is capable of outputting or storing the processed media data generated using the systems and methods according to the invention, such as a display device, a printer, a copier or other image forming device, a facsimile device, a memory or the like. In exemplary embodiments, the data sink 3140 is assumed to be a display device, such as a computer monitor or the like, and is connected to the I/O interface 3120 of the presentation support system 3000 over the communication link 3141.

The data source 3150 can be a locally or remotely located computer sharing data, a scanner, or any other known or later-developed device that is capable of generating electronic media, such as a document. The data source 3150 may also be a data carrier, such as a magnetic storage disc, CD-ROM or the like. Similarly, the data source 3150 can be any suitable device that stores and/or transmits electronic media data, such as a client or a server of a network, or the Internet, and especially the World Wide Web, and news groups. The data source 3150 may also be any known or later developed device that broadcasts media data.

The electronic media data of the data source 3150 may be text, a scanned image of a physical document, media data created electronically using any software, such as word processing software, or media data created using any known or later developed programming language and/or computer software program, the contents of an application window on the user's desktop, e.g., the toolbars, windows decorations, a spreadsheet shown in a spreadsheet program, or any other known or later-developed data source.

The user input device 3160 may be any known or later-developed device that is capable of imputing data and/or control commands to the presentation support system 3000 via the communication link 3161. The user input device may include one or more of a keyboard, a mouse, a touch pen, a touch pad, a pointing device, or the like. The use input device may also be remotely controlled.

The communication links 3130, 3141, 3151 and 3161 can each be any known or later-developed device or system for connecting between the controller 3010, the memory 3020, the slide construction circuit, routine or application 3030, the text label creation circuit, routine or application 3040, the structure construction circuit, routine or application 3050, the layout management circuit, routine or application 3060, the modification management circuit, routine or application 3070, the path construction/update circuit, routine or application 3080, the optional path display circuit, routine or application 3090, the slide show management circuit, routine or application 3100, the navigation circuit, routine or application 3110, and the input/output (I/O) interface 3120, to the data sink 3140, the data source 3150, and the user input device 3160, respectively, to the presentation support system 3000, including a direct cable connection, a connection over a wide area network or local area network, a connection over an intranet, a connection over the Internet, or a connection over any other distributed processing network system. Further, it should be appreciated that the communication links 3130, 3141, 3151 and 3161 can be, a wired wireless or optical connection to a network. The network can be a local area network, a wide area network, an intranet, the Internet, or any other known or later-developed other distributed processing and storage network.

In the exemplary embodiments outlined above, the presentation support system 3000 can be implemented using a programmable general-purpose computer. However, the presentation support system 3000 can also be implemented using a special purpose computer, a programmable microprocessor or microcontroller and peripheral integrated circuit elements, an ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowchart shown in FIGS. 11-12 can be used to implement the presentation support system 3000.

Each of the circuit or routines and elements of the various exemplary embodiments of the presentation support system 3000 outlined above can be implemented as portions of a suitable programmed general purpose computer. Alternatively, each of the circuit, routine or applications and elements of the various exemplary embodiments of the presentation support system 3000 outlined above can be implemented as physically distinct hardware circuit within an ASIC, or using FPGA, a PDL, a PLA or a PAL, or using discrete logic elements or discrete circuit elements. The particular form each of the circuit and elements of the various exemplary embodiments of the presentation support system 3000 outlined above will take is a design choice and will be obvious and predicable to those skilled in the art.

Moreover, the exemplary embodiments of the presentation support system 3000 outlined above and/or each of the various circuit, routine or applications and elements discussed above can each be implemented as software routines, managers or objects executing on a programmed general purpose computer, a special purpose computer, a microprocessor or the like. In this case, the various exemplary embodiments of the presentation support system 3000 and/or each or the various circuit and elements discussed above can each be implemented as one or more routines embedded in the communication network, as a resource residing on a server, or the like. The various exemplary embodiments of the presentation support system 3000 and the various circuit and elements discussed above can also be implemented by physically incorporating the presentation support system 3000 into a software and/or hardware system, such as the hardware and software system of a web server or a client device.

It is apparent that the steps shown in FIGS. 11-12 are described for illustration purposes, and in various exemplary embodiments, the various steps described above, may be performed in a different order and/or with additional or fewer steps. Furthermore, this invention is not limited to the above described flowcharts.

Additionally, those skilled in the art will recognize many applications for this invention include, but not limited to, document display devices, such as browser devices, that display applications of a personal computer, handheld devices, and the like. This invention has application to any known or later-developed systems and devices capable of interactively classifying objects in a workspace.

While this invention has been described in conjunction with the exemplary embodiments outlined above, it is evident that many alternatives, modifications and variation will be apparent to those skilled in the art. Accordingly, the exemplary embodiments of this invention, as set forth above, are intended to be illustrative, not limiting. Various changes may be made without departing from the

What is claimed is:

1. A method for supporting a slide presentation in a zoomable space, the method comprising:
   recursively providing a structure of presentation information, the presentation information including one or more of slides, text labels, and graphical elements;
   providing a hierarchy in the presentation information, the hierarchy including different levels;
   analyzing the levels of the hierarchy and automatically generating a layout of the presentation information in the zoomable space in a format including at least one of an outline format and a nested rectangular grouping, based on the levels of the hierarchy when the hierarchy is provided or in real time as the hierarchy is being provided;
   automatically synchronizing a layout of the presentation information in the zoomable space based on the structure of the presentation information: and
   automatically updating the hierarchy when a user edits the layout in the zoomable space.

2. The method according to claim 1, further comprising:
   creating a path based on the hierarchy, the path being a sequence of the presentation information for the slide presentation;
   receiving a modification in at least one of the hierarchy and the layout; and
   updating the path based on the modification.

3. The method according to claim 1, wherein the structure of the presentation information is a hierarchy of the presentation information.

4. The method according to claim 1, further comprising displaying the presentation information based on the path.

5. The method according to claim 2, further comprising synchronizing a hierarchy and the layout based on the modification.

6. The method according to claim 1, further comprising displaying a path.

7. The method according to claim 6, wherein the path is displayed using thumbnail images of the information.

8. The method according to claim 1, further comprising displaying a updated path.

9. The method according to claim 8, wherein the path is displayed using thumbnail images of the information.

10. The method according to claim 2, further comprising:
    taking a graphical image of a particular area of the zoomable space; and
    inserting the graphical image as presentation information in the path.

11. The method according to claim 1, further comprising allowing a user to navigate the presentation information in a direction in the zoomable space, the direction including navigating to at least one of a higher level of a hierarchy, a lower level of the hierarchy, and the presentation information in the same level of the hierarchy.

12. The method according to claim 11, further comprising at least one of:
    displaying indicators on a current slide such that text labels and/or the slides near the current slide are indicated; and
    displaying indications to indicate the level of hierarchy of the current slide.

13. The method according to claim 11, wherein the navigation includes going to a higher level in the hierarchy, a lower level in the hierarchy, another information in the same level of the hierarchy, and a root of the hierarchy.

14. The method according to claim 11, wherein the navigation includes zooming into and out from a particular area in the zoomable space.

15. A method for supporting a slide presentation in a zoomable space, the method comprising:
    recursively providing a structure of presentation information, the presentation information including one or more of slides, text labels, and graphical elements;
    providing a hierarchy of the presentation information, the hierarchy including different levels;
    analyzing the levels of the hierarchy and automatically providing a layout of the presentation information in the zoomable space in a format including at least one of an outline format and a nested rectangular grouping, based on the levels of the hierarchy when the hierarchy is provided or in real time as the hierarchy is being provided;
    automatically updating the hierarchy when a user edits the layout in the zoomable space;
    providing a path based on the structure of the presentation information;
    providing a plurality of synchronizations through the presentation information; and
    automatically updating the path based on a modification upon receiving the modification in at least one of the structure of the presentation information and the layout.

16. A method for supporting a slide presentation in a zoomable space, the method comprising:
    recursively providing a hierarchy of presentation information, the presentation information including one or more of slides, text labels, and graphical elements;
    providing a hierarchy in the presentation information, the hierarchy including different levels;
    analyzing the levels of the hierarchy and automatically providing a layout of the presentation information in the zoomable space in a format including at least one of an outline format and a nested rectangular grouping, based on the levels of the hierarchy when the hierarchy is provided or in real time as the hierarchy is being provided;
    automatically providing a plurality of synchronizations through the presentation information;
    automatically updating the hierarchy when a user edits the layout in the zoomable space; and
    allowing a user to navigate the presentation information in a direction in the zoomable space, the direction including navigating to at least one of a higher level of the hierarchy, a lower level of the hierarchy, and the presentation information in the same level of the hierarchy.

17. A system for supporting a slide presentation in a zoomable pace, comprising:
    a structure construction circuit, that recursively provides a structure of presentation information, the presentation information including one or more of slides, text labels and graphical elements, and that provides a hierarchy in the presentation information, the hierarchy including different levels; and
    a layout management circuit, that analyzes the levels of the hierarchy, automatically generates a layout off presentation information in the zoomable space in a format including at least one of an outline format and a nested rectangular grouping, based on the levels of the hierarchy when the hierarchy is provided or in real time as the hierarchy is being provided, synchronizes the layout of the presentation information in the zoomable space based on the structure of the presentation information, updates the hierarchy when a user edits the layout in the zoomable space and that provides a plurality of synchronizations through the presentation information,;

wherein said structure construction circuit and said layout management circuit are implemented in hardware.

18. The system according to claim 17, further comprising: a path construction/update circuit, that creates a path based on the structure, the path being a sequence of the presentation information for the slide show, and automatically updates the path based on a modification in at least one of a hierarchy and the layout, received by a modification management circuit; and wherein said construction/update circuit is implemented in hardware.

19. The system according to claim 17, wherein the structure of the presentation information is the hierarchy of the presentation information.

20. The system according to claim 17, further comprising a slide show management circuit, that displays the presentation information based on a path; and wherein said slide show management circuit is implemented in hardware.

21. The system according to claim 17, further comprising: a slide construction circuit, that allows the user to create the slides;

and a text label creation circuit,. that allow the user to create the text labels; and wherein said slide construction circuit is implemented in hardware.

22. The system according to claim 17, wherein the modification management circuit, synchronizes the hierarchy a hierarchy and the layout based on the modification a modification; and wherein said modification management circuit is implemented in hardware.

23. The system according to claim 17, further comprising a path display circuit, that displays the path and an updated path; and wherein said path display circuit is implemented in hardware.

24. The system according to claim 23, wherein the path display circuit, displays the path using thumbnail images of the information; and wherein said display circuit is implemented in hardware.

25. The system according to claim 18 wherein the path construction/update circuit, takes a graphical image of a particular area of the zoomable space and inserts the graphical image as presentation information in the path; and wherein said path construction/update circuit is implemented in hardware.

26. The system according to claim 17, further comprising a navigation circuit that allows the user to navigate the presentation information in a direction in the zoomable space, the direction including navigating to at least one of a higher level of the hierarchy, a hierarchy, a lower level of the hierarchy, and the presentation information in the same level of the hierarchy; and wherein said navigation circuit is implemented in hardware.

27. The system according to claim 26, wherein the navigation circuit displays indicators of a current slide such that the text labels and/or the slides near the current slide are indicated, and displays indications to indicate the level of hierarchy of the current slide.

28. The system according to claim 26, wherein the navigation circuit navigates the zoomable space by going to a higher level in the hierarchy, a lower level in the hierarchy, another information in the same level of the hierarchy, and a root of the hierarchy; and wherein said navigation circuit is implemented in hardware.

29. The system according to claim 26, wherein the navigation circuit zooms into and out from a particular area in the zoomable space.; and wherein said navigation circuit is implemented in hardware.

30. A system for supporting a slide show in a zoomable space, comprising:

a structure construction circuit that recursively provides a structure of presentation information, the presentation information including one or more of slides, text labels and graphical elements, and that provides a hierarchy of the presentation information, the hierarchy including different levels;

a layout management circuit that analyzes the levels of the hierarchy and automatically provides a layout of the presentation information in the zoomable space in a format including at least one of an outline format and a nested rectangular grouping, based on the levels of the hierarchy when the hierarchy is provided or in real time as the hierarchy is being provided and that updates the hierarchy when a user edits the layout in the zoomable space;

a path construction/update circuit that creates a path based on the structure of the presentation information and automatically updates the path based on a modification upon receiving the modification in at least one of the structure of the presentation information and the layout, and that provides a plurality of synchronizations through the presentation information; and wherein said structure construction circuit, said layout management circuit, and said path construction/update circuit are implemented in hardware.

31. A system for supporting a slide show in a zoomable space, comprising:

a structure construction circuit that recursively provides a hierarchy of presentation information, the presentation information including one or more of slides, text labels and graphical elements;

a layout management circuit that provides a layout of the presentation information in the zoomable space based on the hierarchy; a navigation circuit, that allows a user to navigate the presentation information in a direction in the zoomable space, the direction including navigating to at least one of a higher level of the hierarchy, a lower level of the hierarchy, and the presentation information in the same level of the hierarchy; and wherein said structure construction circuit, said layout management circuit, and said path construction/update circuit are implemented in hardware.

32. The method according to claim 1, wherein the layout of the presentation information in the zoomable space is an outline format in a nested rectangular grouping each level of hierarchy in a bounded box with a title.

* * * * *